R. R. ROYAL.
SECTIONAL WHEEL RIM.
APPLICATION FILED MAR. 22, 1915.
1,178,754.
Patented Apr. 11, 1916.
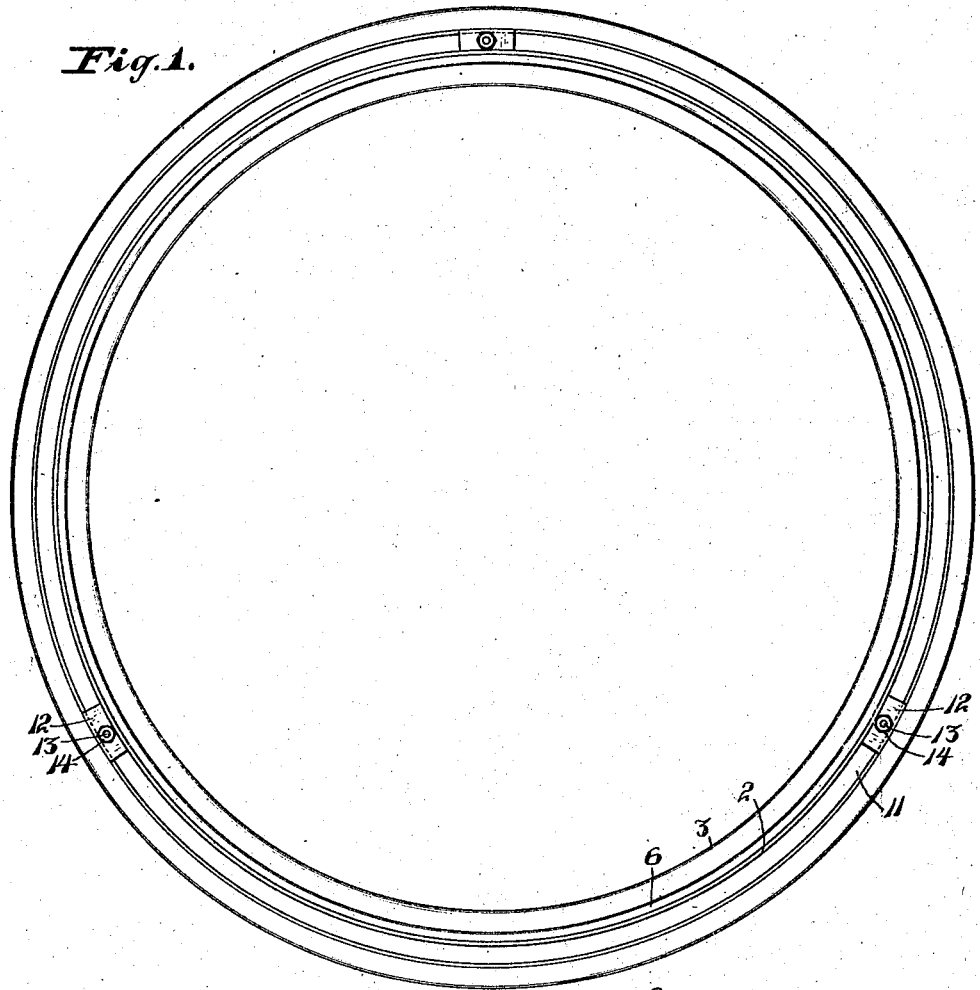
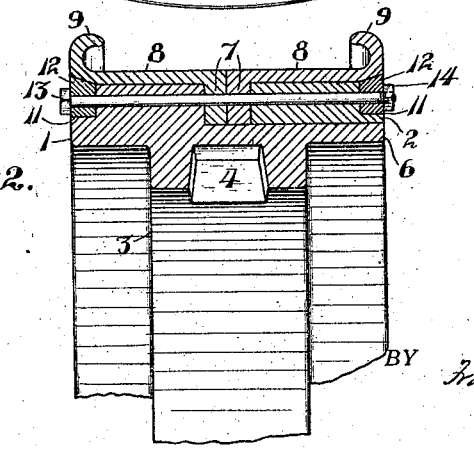
WITNESSES:
INVENTOR,
Roscoe R. Royal,
BY
ATTORNEY

UNITED STATES PATENT OFFICE.

ROSCOE R. ROYAL, OF SAN FRANCISCO, CALIFORNIA.

SECTIONAL WHEEL-RIM.

1,178,754.  Specification of Letters Patent.  Patented Apr. 11, 1916.

Application filed March 22, 1915.  Serial No. 16,070.

*To all whom it may concern:*

Be it known that I, ROSCOE R. ROYAL, a citizen of the United States, residing at San Francisco, in the county of San Francisco and State of California, have invented new and useful Improvements in Sectional Wheel-Rims, of which the following is a specification.

The object of the present invention is to provide a rim for a wheel and means for securing a tire thereto, of cheap and simple construction and such that the tire can be quickly removed and replaced.

In the accompanying drawing, Figure 1 is a side view of a rim of a wheel constructed in accordance with my invention; Fig. 2 is an enlarged partial cross-sectional view thereof.

Referring to the drawing, 1, 2 indicate felly sections, each completely annular in form, of which the section 1 has a central narrow inward extension 3 formed with sockets 4 to receive the spokes of the wheel. The section 1 is much thicker on one side than on the other, and the section 2 surrounds the inner portion 6 of the section 1, and the combined thicknesses of the section 2 and the thinner portion 6 of the section 1 are equal to the thickness of the thicker portion of the section 1. Said thicker portion of the section 1 is spaced from the section 2 a sufficient distance to receive therebetween two annular flanges 7 extending inwardly respectively from the inner or adjoining edges of rim sections 8, the outer edges 9 of which are hook-shaped to engage and hold correspondingly shaped edges of a tire of the usual form. Said felly section 1 is formed with a groove 11, in which are placed at suitable intervals, three being here shown, locking blocks 12. Bolts 13 are passed through holes in said blocks, in the thicker portion of the section 1, in the inwardly extending flanges 7, and in the section 2, and nuts 14 are secured on the ends of said bolts. These bolts, by compressing very firmly the two annular flanges between the sections 1 and 2, firmly hold the rim sections together and thereby hold the tire in place. At the same time it is readily seen with how great ease and rapidity the tire can be removed, all that is necessary for that purpose being to unscrew the three or more nuts 14, when the two rim sections can be separated and the tire thus removed.

I claim:—

In combination, felly sections, one of which is thicker on one side than on the other, the other section surrounding the thinner portion of the first-named section, rim sections having annular flanges extending inwardly from their inner or adjoining edges, said sections being spaced from each other a sufficient distance to receive therebetween said flanges, registering holes in the thicker portion of the first-named sections, in the inwardly extending flanges and in the other section, bolts through said holes and nuts on the ends of the bolts, and bolting together the felly sections and the rim sections.

In testimony whereof I have hereunto set my hand in the presence of two subscribing witnesses.

ROSCOE R. ROYAL.

Witnesses:
 F. M. WRIGHT,
 D. B. RICHARDS.